(12) United States Patent
Borck (10) Patent No.: US 6,779,568 B2
(45) Date of Patent: Aug. 24, 2004

(54) GAS DISTRIBUTION SYSTEM

(75) Inventor: Joachim George Borck, Cloverdale (CA)

(73) Assignee: General Hydrogen Corporation, Seattle, WA (US)

( * ) Notice: Subject to any disclaimer, the term of this patent is extended or adjusted under 35 U.S.C. 154(b) by 0 days.

(21) Appl. No.: 10/621,782

(22) Filed: Jul. 16, 2003

(65) Prior Publication Data

US 2004/0118476 A1 Jun. 24, 2004

Related U.S. Application Data

(60) Provisional application No. 60/396,704, filed on Jul. 16, 2002.

(51) Int. Cl.[7] .................................................. B65B 1/04
(52) U.S. Cl. ........................ 141/67; 141/95; 141/192; 137/113
(58) Field of Search ........................ 141/67, 95, 192, 141/198, 83, 9, 100; 137/113

(56) References Cited

U.S. PATENT DOCUMENTS

| | | | | |
|---|---|---|---|---|
| 3,643,677 A | * | 2/1972 | Begleiter | 137/113 |
| 3,719,196 A | | 3/1973 | McJones | 137/110 |
| 5,107,906 A | * | 4/1992 | Swenson et al. | 141/11 |
| 5,431,203 A | * | 7/1995 | Schultz et al. | 141/197 |
| 5,538,051 A | * | 7/1996 | Brown et al. | 141/18 |
| 5,832,906 A | | 11/1998 | Douville et al. | 123/527 |
| 6,516,615 B1 | | 2/2003 | Stockhausen et al. | 60/597 |
| 2002/0162698 A1 | | 11/2002 | Oglesby et al. | 180/301 |

* cited by examiner

*Primary Examiner*—Steven O. Douglas
(74) *Attorney, Agent, or Firm*—Dorsey & Whitney LLP (57) ABSTRACT

A gas distribution system according to an embodiment includes flowing a first gas stream from a first dispensing cylinder to a receiving cylinder. When the pressure differential between the first dispensing cylinder and the receiving cylinder obtains a selected value, stopping the flow of the first gas stream, and flowing a second gas stream from a second dispensing cylinder to the receiving cylinder. When the pressure differential between the second dispensing cylinder and the receiving cylinder obtains a selected value, stopping the flow of the second gas stream, increasing the pressure of a third gas stream from the first dispensing cylinder to a pressure greater than the second dispensing cylinder pressure, and flowing the third gas stream into the second dispensing cylinder until the pressure in the second cylinder has increased to a selected value. In other embodiments, an intensifier is used to increase the pressure of a gas stream.

11 Claims, 9 Drawing Sheets

GAS DISTRIBUTION SYSTEM

RELATED APPLICATIONS

This application claims priority from and incorporates by reference U.S. provisional application No. 60/396,704 "Gas Distribution System" to Borck, filed on Jul. 16, 2002.

FIELD OF THE INVENTION

The present invention relates generally to gas transfer systems, and more particularly to a system for filling a receiving cylinder with gaseous fuel.

BACKGROUND OF THE INVENTION

The increasing demand for alternative fuel vehicles, specifically hydrogen gas fueled vehicles, will require hydrogen fueling stations that can efficiently provide rapid gas filling to vehicles being filled, and efficiently use available gas storage to provide as many fills as possible. One type of gaseous fuel powered vehicle is a fuel cell vehicle (FCV), which uses a fuel cell to electrochemically generate electricity from hydrogen fuel and uses the electricity to power the vehicle. FCVs may use pure hydrogen delivered directly from a hydrogen fueling station.

Hydrogen for use as a fuel in a FCV can be stored in vehicles as a gas in suitable containers, referred to as cylinders. Typically, presently available vehicle cylinders are rated up to 6500 p.s.i. at standard temperature conditions. Obviously, the hydrogen gas cylinder(s) in a vehicle must be recharged from time to time, and it is highly desirable to charge a vehicle's hydrogen cylinder(s) to the highest pressure possible within a given period of time. A station for dispensing hydrogen gas may store the hydrogen gas in banks of cylinders. These cylinder(s) can initially be all charged to full, but as gas is dispensed the cylinder(s) will be at varying pressures below a complete charge. The process of withdrawing the gas and charging individual station cylinders may result in more or less efficient use of the stored gas, and faster or slower time to fill a vehicle cylinder.

One solution for rapid filling is a charging system by McJones, in U.S. Pat. No. 3,719,196, which describes a system to sequentially charge and discharge from a group of containers, for use in filling vehicle cylinders with natural gas. The use of sequential dispensing assists in effective maximum utilization of the filling force available. The system of '196 requires a continuous source of pressurized gas, such as a large storage container, from which the series of containers are charged in a sequential process, in preparation for a selective sequence of dispensing. Hence the system and process is not closed, and is not the most efficient for a standalone station which is periodically recharged. There is no internal transfer or charge between the series of containers.

SUMMARY OF THE INVENTION

According to one aspect of the invention, there is provided a method of filling a receiving cylinder with gas that includes the following steps: a) flowing a first gas stream from a first dispensing cylinder to a receiving cylinder using a pressure differential between the cylinders; b) when the pressure differential between the first dispensing cylinder and the receiving cylinder has fallen to a selected value, stopping the flow of the first gas stream, then flowing a second gas stream from a second dispensing cylinder to the receiving cylinder using a pressure differential between the second dispensing cylinder and the receiving cylinder; and c) when the pressure differential between the second dispensing cylinder and the receiving cylinder has fallen to a selected value, stopping the flow of the second gas stream, then increasing the pressure of a third gas stream from the first dispensing cylinder to a pressure greater than the pressure in the second dispensing cylinder, and then flowing the third gas stream into the second dispensing cylinder until the pressure in the second cylinder has increased to a selected value.

In this method, the third gas stream pressure may be increased by an intensifier. The intensifier may be powered by one of a hydraulic pump, an air compressor and an electric motor. Or, the intensifier may be powered by a gas stream from one of the dispensing cylinders; in such case, the method includes an additional step before step (a), namely, flowing a fourth gas stream from the first dispensing cylinder, through a driver of the intensifier then to the receiving cylinder using a pressure differential between the first dispensing cylinder and the receiving cylinder, and then flowing the third gas stream from the first dispensing cylinder through a compressor of the intensifier to increase the third gas stream pressure.

In step (b), the first gas stream flow may be stopped when the pressures of the first dispensing cylinder and receiving cylinder have equalized. In step (c), the second gas stream flow is stopped when the pressures of the second dispensing cylinder and receiving cylinder have equalized.

According to another aspect of the invention, there is provided a method of filling a receiving cylinder with gas using an intensifier having a compressor powered by a gas driver; the method includes the following steps: a) flowing a first gas stream from a first dispensing cylinder, through a driver of an intensifier and then to a receiving cylinder using a pressure differential between the cylinders; b) flowing a second gas stream from the first dispensing cylinder through a compressor of the intensifier such that the pressure of the second gas stream is increased above the pressure of a second dispensing cylinder, then flowing the second gas stream to the second dispensing cylinder; c) when the pressure differential between the receiving cylinder and the first dispensing cylinder has fallen to a first selected value, stopping the flow of the first and second gas streams, then flowing a third gas stream from the first dispensing cylinder to the receiving cylinder that bypasses the intensifier and uses a pressure differential between the first dispensing cylinder and the receiving cylinder; and d) when the pressure differential between the receiving cylinder and the first dispensing cylinder has fallen to a second selected value, stopping the flow of the third gas stream, then flowing a fourth gas stream from the second dispensing cylinder to the receiving cylinder using a pressure differential between the second dispensing cylinder and the receiving cylinder.

According to another aspect of the invention, there is provided a gas dispensing system for filling a receiving cylinder with gas. The system includes: a) a receiving cylinder port fluidly connectable to a receiving cylinder; b) a first dispensing cylinder; c) a second dispensing cylinder; d) a gas pressure intensifier; e) a fluid flow circuit comprising fluid conduits fluidly coupling the first dispensing cylinder to the receiving cylinder port, the second dispensing cylinder to the receiving cylinder port, and the first dispensing cylinder to the second dispensing cylinder, and wherein the intensifier is fluidly coupled to the fluid flow circuit such that the pressure of a gas stream from the first cylinder can be increased above the pressure of the second cylinder thereby enabling the gas stream to be flowed from the first cylinder into the second cylinder; and f) gas flow valves fluidly coupled to the fluid flow circuit such that a gas stream can be controlled to flow from the first dispensing cylinder to the receiving cylinder port, from the second dispensing cylinder to the receiving cylinder port, and from the first receiving cylinder through the intensifier and to the second receiving cylinder.

The intensifier may be powered by one of a hydraulic pump, an air compressor and an electric motor. Or, the intensifier may comprise a compressor and a gas driver that powers the compressor, and the fluid flow circuit may further comprise a first fluid flow path from the first dispensing cylinder through the driver and to the receiving cylinder port, and a second fluid flow path from the first dispensing cylinder through the compressor and to the second dispensing cylinder. The gas flow valve may be configured to direct first and second gas streams through the first and second fluid flow paths such that the first gas stream powers the intensifier to increase the pressure of the second gas stream flowing therethrough.

DETAILED DESCRIPTION OF DRAWINGS

DETAILED DESCRIPTION

FIGS. 1 to 9 show a gas distribution system 100 that comprises two or more compressed gas storage cylinders, an intensifier, valves, pressure transducers, gas lines, and a system controller that operates software specific to the operation of the system. The functions of the gas distribution system are to:

a) dispense gas to receiving cylinders, such as may be found on gas-powered vehicles; and b) transfer gas internally within the system such that the amount of gas at high pressure is maximized The term "gas" should be understood to mean a substance that is in a gaseous state of matter, such as natural gas or hydrogen, that by nature can be compressed, and not a liquid fuel, such as gasoline, that by nature cannot be compressed.

The compressed gas storage cylinders are pressure vessels capable of holding gases at high pressure, and when fully charged hold the same or similar amounts of gas, which is to say, they are at the same, or approximately the same, gas pressure. The gas pressure within a cylinder is reduced as gas is dispensed, leading to varying pressures between cylinders of the system. One cylinder then contains the highest pressure of gas, and is hereby referred to as the "high pressure cylinder" 101, or for the sake of brevity "cylinder A". One cylinder then contains gas at a pressure lower than within the high pressure cylinder, and is hereby referred to as the "lower pressure cylinder" 102, or for the sake of brevity "cylinder B". In the minimum embodiment, the gas distribution system 100 has two gas storage cylinders, but the system could have any number of cylinders, with the additional cylinders serving the same function as the cylinders A and B. Gas is dispensed from one cylinder at a time. The use of the comparative terms "high", "higher", "highest", "low", "lower" and "lowest" in this context does not indicate a difference in the pressure containable within the cylinder, rather these terms reflect the amount of gas pressure contained within the cylinder.

Receiving cylinders 110 are outside of the gas distribution system 100 and may be vehicle gas storage cylinders, portable gas storage cylinders, or any pressure vessel that may be filled by a compressed gas.

FIGS. 1 to 9 show a cylinder A 101 that is coupled to a cylinder A transfer line 131, which is coupled to a cylinder A control valve 121. The cylinder A control valve 121 opens in response to a command from a connected system controller (not shown) to allow the transfer of gas from the cylinder A transfer line 131 to the cylinder A output line 151.

A cylinder A pressure transducer 111 senses the gas pressure within the cylinder A transfer line 131, and signals the system controller, thereby allowing the controller to monitor the pressure within the circuit. The pressure transducer 111 may alternatively be located elsewhere on the circuit; or other means of sensing pressure and signaling the pressure value may be used, as would occur to those skilled in the art.

Cylinder B 102 is coupled to a cylinder B transfer line 132, which is coupled to a cylinder B control valve 122. The cylinder B control valve 122 opens in response to a command from the connected system controller (not shown) to allow the transfer of gas from the cylinder B transfer line 132 to the cylinder B output line 152.

A cylinder B pressure transducer 112 senses the gas pressure within the cylinder B transfer line 132 and signals a connected system controller, thereby allowing the controller to monitor the pressure within the circuit.

The cylinder A output line 151 is coupled to a second transfer line control valve 124, which is coupled to the cylinder B output line 152, which is coupled to a system transfer line 154, which is coupled to a first transfer line control valve 126, which is coupled to a system port line 156 and a service port 400. These coupled components form a "fill transfer circuit" that is leak-proof and designed for fast-filling and has suitable dimensions and gas conductance as will be appreciated by those skilled in the art. The system output line pressure transducer 113 senses the gas pressure within the system port line 156 and signals the connected system controller (not shown), thereby allowing the controller to monitor the pressure within the circuit. Alternatively, the signal from cylinder A pressure transducer 111 or from cylinder B pressure transducer 112 may be used to instead of pressure transducer 113 to measure the pressure within the dispensing circuit. The cylinder A output line 151 is coupled such that when both the cylinder A control valve 121 and the second transfer line control valve 124 are open, the gas from the cylinder A 101 can flow into the system transfer line 154. The cylinder B output line 152 is coupled such that when the cylinder B control valve 122 is open, the gas from cylinder B 102 can flow into the system transfer line 154.

The service port 400 is the system outlet for the purpose of dispensing gas from the gas distribution system 100 to a receiving cylinder 110. While the service port 400 is described for such function, it should be understood that the system 100 requires a port through which the system 100 is charged with gas from time to time, and that the service port 400 can serve as the supply port for such charging. Likewise, while the gas transfer lines are described with respect to their gas dispensing function, it should be understood that the transfer lines can transfer gas bidirectionally, and thereby be used in charging of the system 100. Charging of the system 100 from time to time is required to enable the system 100 to dispense gas, and may be configured in ways well known in the art. It should be understood that the system 100 described herein is not continuously supplied with gas from an external source, and that the described functions occur using a fixed amount of gas charge resident within the system.

Figure 1:
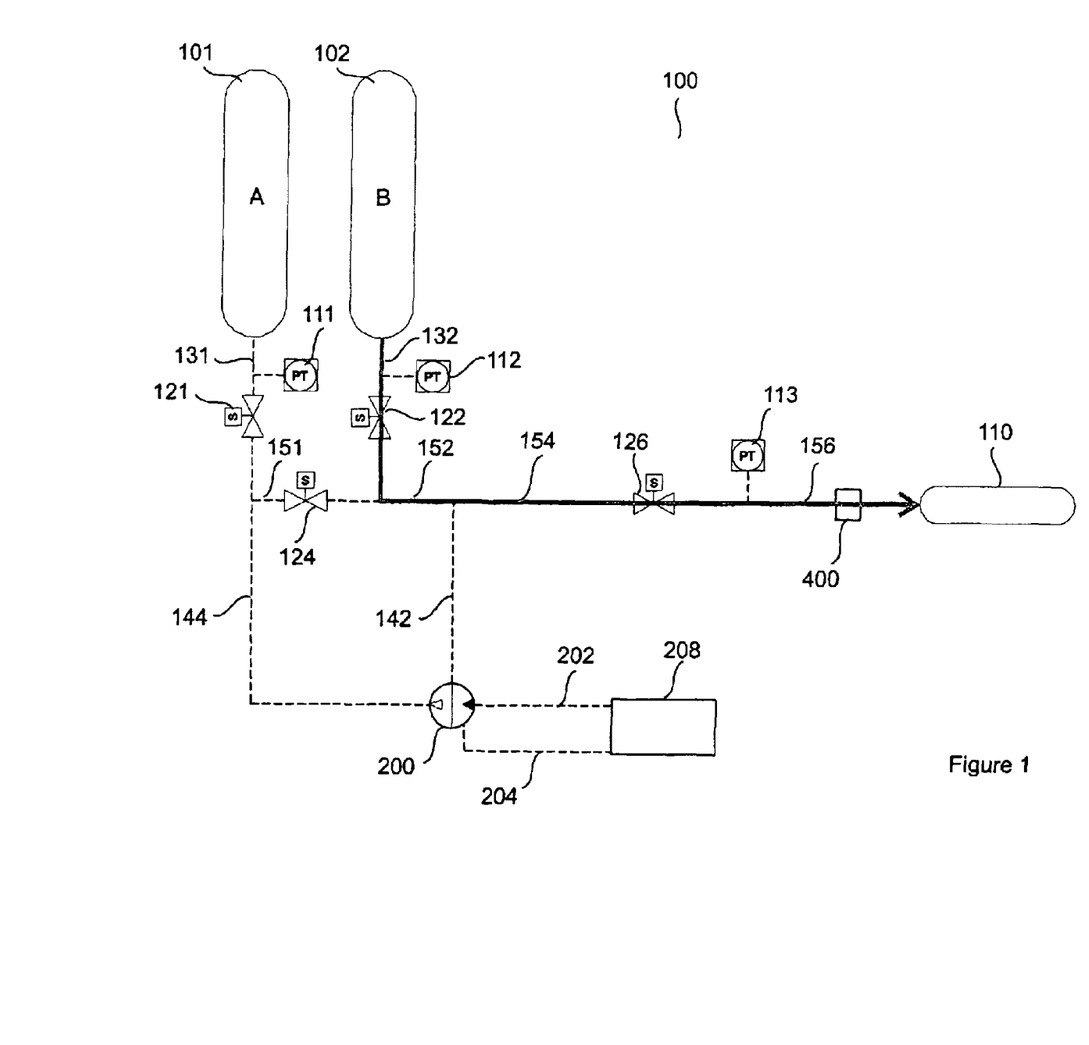
FIG. 1 is a schematic diagram of a gas distribution system using a powered intensifier in which the first stage of a three-stage process is shown.
Figure 2:
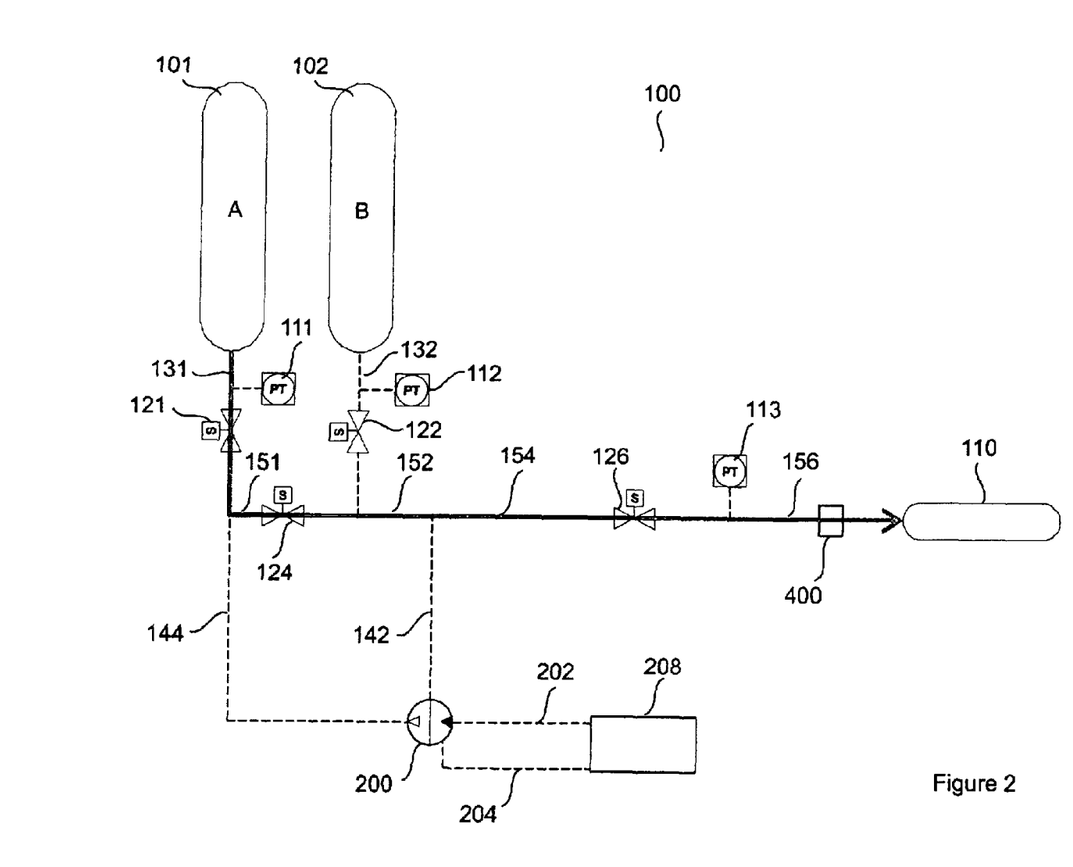
FIG. 2 is a schematic diagram of a gas distribution system using a powered intensifier in which the second stage of a three-stage process is shown.
Figure 3:
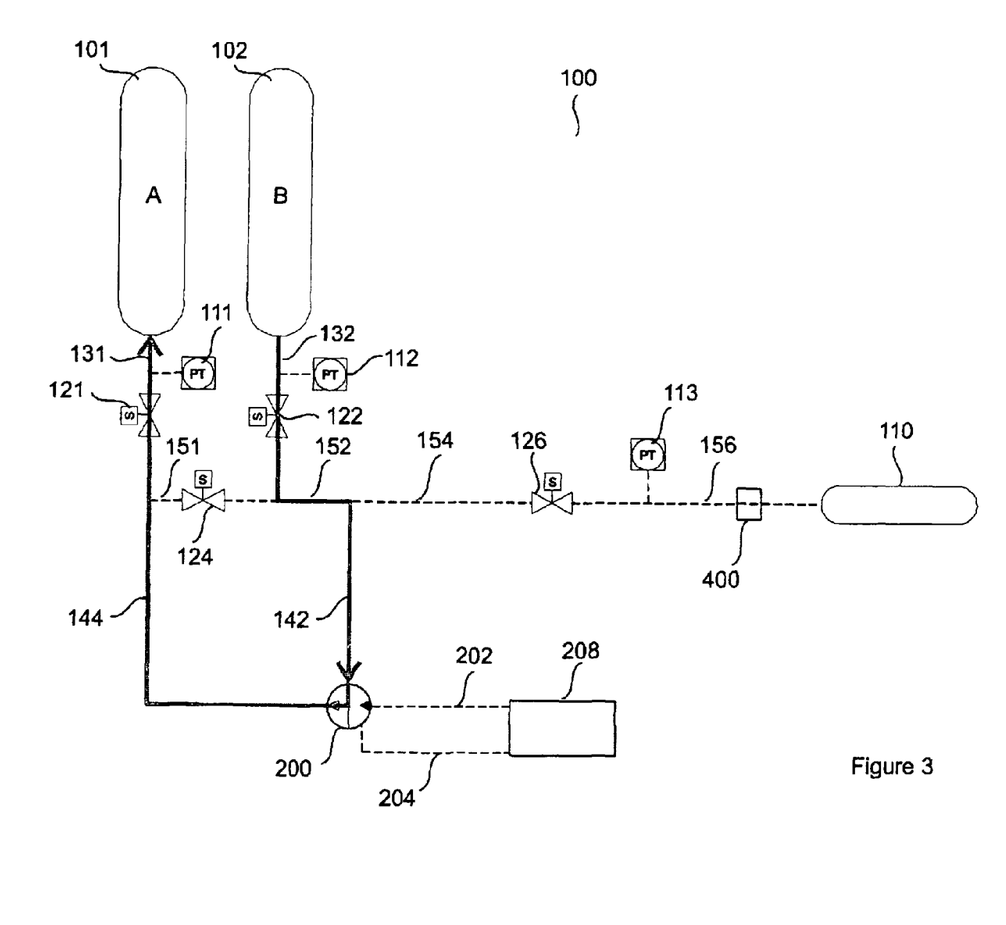
FIG. 3 is a schematic diagram of a gas distribution system using a powered intensifier in which the third stage of a three-stage process is shown.

FIGS. 1 to 3 show a gas distribution system 100 that has a powered intensifier 200. The intensifier 200 is actuated by an intensifier power source 208, such as an air compressor, the compressed air being supplied to the intensifier 200 by the intensifier power supply line 202 and returned to the intensifier power source 208 by the intensifier power return line 204. Alternatively, the intensifier power source 208 may be a hydraulic pump, and the actuating fluid may be hydraulic fluid. Alternatively, the intensifier power source may be an electric motor, and the power supply and return lines may be electrical cables and the actuating medium is electricity.

The system and components shown in FIGS. 1 to 3 are the same, while the gas path highlighted in the three drawings is different to indicate the gas flow path used in each of the three described stages of the gas dispensing and internal transfer processes that use a powered intensifier 200.

When the gas storage cylinders 101, 102 are fully charged with gas, they contain gas at the same pressure, however, after any amount of gas dispensing to a receiving cylinder 110, cylinder B of this system 100 contains gas at a lower pressure than cylinder A 101. The receiving cylinder 110 is coupled to the system 100 through the service port 400 for the purpose of being filled, and is assumed to contain gas at a lower pressure than at least one of the system gas storage cylinders 101, 102 at the time of coupling, as would be expected in a fueling station. The system 100 is expected to have gas storage cylinders 101, 102 that are larger in size than the receiving cylinders it dispenses to, such that the amount of gas resident in a fully charged gas distribution system 100 is more than one receiving cylinder 110 can receive.

FIG. 1 shows the gas flow path from the cylinder B 102 to a receiving cylinder 110. The receiving cylinder 110 is outside of the gas distribution system 100 and may be a vehicle gas storage cylinder, a portable gas storage cylinder, or any pressure vessel that requires filling by compressed gas. The receiving cylinder 110 is coupled to the service port 400 to receive gas dispensed from the system 100.

During gas dispensing from the system 100 to a receiving cylinder 110, gas from the cylinder B 102 is dispensed first, as indicated by the gas flow path in FIG. 1. The controller (not shown) opens the first transfer line control valve 126 and the cylinder B control valve 122, allowing gas to flow from the cylinder B 102 through the cylinder B transfer line 132, the cylinder B output line 152, the system transfer line 154 and the system port line 156 to the service port 400 and into the receiving cylinder 110.

The cylinder B pressure transducer 112 and a receiving cylinder pressure transducer (not shown) signal the system controller (not shown) which uses those signals to calculate the pressure differential between cylinder B and the receiving cylinder 110. The controller compares the pressure differential to a predetermined value, and closes the cylinder B control valve 122 when the predetermined pressure differential has been reached, or when the pressure differential is zero. Alternatively, the signal from pressure transducer 113 may be used to measure the pressure within the dispensing circuit. Alternatively, a flow sensor (not shown) installed on the circuit is used to measure the gas flow and signal the controller. The controller compares the gas flow to a predetermined value, and closes the cylinder B control valve 122 when the predetermined flow has been reached, or when the flow is zero.

FIG. 2 shows the next stage in gas dispensing following that shown in FIG. 1, and indicates the gas flow path of this stage. The controller (not shown) opens the cylinder A control valve 121, allowing gas to flow from the cylinder A 101 through the cylinder A transfer line 131, the cylinder A output line 151, the cylinder B output line 152, the system transfer line 154 and the system port line 156 to the service port 400 and into the receiving cylinder 110.

The cylinder A pressure transducer 111 and a receiving cylinder pressure transducer (not shown) signal the system controller (not shown) which uses those signals to calculate the pressure differential between cylinder A and the receiving cylinder 110. The controller compares the pressure differential to a predetermined value, and closes the cylinder A control valve 121 and the second transfer line control valve 124 when the predetermined pressure differential has been reached, or when the pressure differential is zero. Alternatively, a signal from the system output line pressure transducer 113 may be used to measure the pressure within the dispensing circuit. Alternatively, a flow sensor (not shown) installed on the circuit is used to measure the gas flow and signal the controller. When a flow sensor is installed, the controller compares the gas flow to a predetermined value, and closes the cylinder A control valve 121 and the second transfer line control valve 124 when the predetermined flow has been reached, or when the flow is zero.

At the termination of gas dispensing from cylinder A 101, the receiving cylinder 110 is filled to the maximum pressure possible using the dispensing stages described for FIGS. 1 and 2. The receiving cylinder 110 may then be disconnected from the system 100.

The experimental results provided below were obtained through the operation of a computer model that was calibrated with experimental system testing. The model accurately includes the change of temperature to storage and receiving tanks as a result of pressurized gas transfer, and accurately includes heat dissipation from cylinders to the environment.

| Model Configuration | |
| --- | --- |
| Parameter | Value or description |
| Ambient temperature | 20° C. |
| Initial gas temperature within storage cylinders | 20° C. |
| Initial gas temperature within receiving cylinder | 20° C. |
| Storage tank size and configuration | Two banks of three 205-liter cylinders |
| Receiving tank size | 39-liter cylinder |
| Receiving tank initial pressure | 20 barg |
| Maximum allowable receiving tank temperature | 85° C. |

-continued

| Case Parameters | | | |
|---|---|---|---|
| Case | Bank 1 Initial Pressure [barg] | Bank 2 Initial Pressure [barg] | Pressure Ramp Rate [barg/s] |
| 1 | 300 | 450 | 3 |
| 2 | 450 | 450 | 2.5 |
| 3 | 450 | 450 | 3 |

Case 1 represents a gas distribution system as described as the preferred embodiment, in that a lower pressure gas storage cylinder(s) (Bank 1) is used first for dispensing to a receiving cylinder, followed by the higher pressure gas storage cylinder(s) (Bank 2). In case 1, the initial pressure of the Bank 1 storage cylinders was set to 300 barg, while the pressure of the Bank 2 storage cylinders was set to 450 barg.

Cases 2 and 3 represent a gas distribution system that has the same pressure in both banks of gas storage cylinders. In both cases 2 and 3, the initial pressure of both banks of cylinders was set to 450 barg.

In cases 1 and 3, the pressure ramp rate was set at 3 barg/second, to provide a direct comparison of flow rates, while for case 2, the rate was set at 2.5 barg/second to show the difference that a lower pressure ramp rate has on the receiving cylinder temperature and the time to fuel the receiving cylinder.

| Model Results | | | | |
|---|---|---|---|---|
| Case | Bank 1 Initial Pressure [barg] | Bank 2 Initial Pressure [barg] | Pressure Ramp Rate [barg/s] | Peak Temperature [° C.] | Time to Fuel Receiving Cylinder (seconds) |
| 1 | 300 | 450 | 3 | 85 | 131 |
| 2 | 450 | 450 | 2.5 | 85 | 158 |
| 3 | 450 | 450 | 3 | 87 | 131 |

A comparison of the results for cases 1 and 3 shows that case 1 resulted in the receiving tank reaching a peak temperature less than for case 3 (85° C. compared to 87° C.). Both cases had the same fueling time (131 seconds), however, the peak temperature of the receiving tank in case 3 exceeded the maximum allowable tank temperature by 2° C. in the process.

The results for case 2 show that a lower pressure ramp rate is required to keep the receiving tank peak temperature at the same level as for case 1 (85° C.). The lower rate for case 2, however, results in a longer filling time (158 seconds).

These results indicate that distributing gas first from a lower pressure storage cylinder (or cylinders), and secondly from a higher pressure storage cylinder (or cylinders), causes less receiving tank temperature increase, and results in a faster fueling time.

FIG. 3 shows the internal transfer stage following the filling stages described for FIGS. 1 and 2, and indicates the gas flow path of this stage. The gas flow in this stage is internal to the gas distribution system 100, and gas is not dispensed from the system. In this stage, gas from cylinder B 102 is pressurized and transferred to cylinder A 101 in order to increase the amount and pressure of the gas in cylinder A 101. The controller (not shown) signals the cylinder B control valve 122 and the cylinder A control valve 121 to open, and activates the intensifier 200 through actuation of the intensifier power source 208. Gas then flows from the cylinder B 102 through the cylinder B transfer line 132, the cylinder B output line 152, and the intensifier supply line 142 to the intensifier 200. The intensifier 200 pressurizes the gas and outputs it to the intensifier return line 144, which transfers the gas to the cylinder A transfer line 131 and into the cylinder A 101.

The cylinder A pressure transducer 111 and a cylinder B pressure transducer 112 signal the system controller (not shown), which uses those signals to calculate the pressure differential between cylinders A and B. The controller compares the pressure differential to a predetermined value, and closes the cylinder A and B control valves 121, 122 when the predetermined pressure differential has been reached, or when cylinder A has reached its maximum pressure or when cylinder B has reached its minimum pressure.

Alternatively, a flow sensor (not shown) installed on the circuit is used to measure the gas flow and signal the controller. The controller compares the gas flow to a predetermined value, and closes the cylinder A and B control valves 121, 122 when the predetermined flow has been reached, or when the flow is zero.

After the gas transfer shown in FIG. 3, the amount of gas in the gas distribution system 100 remains the same, but the pressure of gas in cylinder A 101 is higher than it would be without the described transfer, while the pressure of gas in the cylinder B 102 is lower than it would be without the described transfer.

The FIGS. 1 to 3 together describe a gas dispensing and internal transfer process that first dispenses gas to a receiving cylinder 110 in a manner that is more efficient and results in a greater amount and higher pressure of gas dispensed than is typically achieved through conventional gas dispensing systems, and secondly distributes the amount and pressure of the remaining gas within the system such that subsequent gas dispensing to a second receiving cylinder 110 is achieved more quickly and results in a greater amount and higher pressure of gas dispensed than that which would be achieved without the internal gas transfer of FIG. 3. The internal gas transfer has the result that more receiving cylinders 110 can be filled to a high pressure than is possible without the internal gas transfer, and the gas distribution system 100 is able to fully fill more receiving cylinders 110 on a single system gas charge than is possible without the internal gas transfer.

The invention may optimally have a significant number of additional gas storage cylinders in a similar configuration to increase the number of dispensing stages, and consequently to reduce the pressure drop associated with the dispensing from each cylinder.

The ability to dispense gas quickly to a receiving cylinder 110 is desirable in a gas dispensing system such as for a vehicle fueling station. The time required to fill to a receiving cylinder 110 that may be considered quick or fast is approximately the time it takes to fill a vehicle fuel tank with liquid fuel, such as gasoline or diesel.

Quick gas dispensing, or "fast-filling" has been achieved by other gas dispensing systems that incorporate an outlet compressor. Such outlet compressors are activated during gas dispensing and are of necessity capable of rapid compression operation in order to provide pressurized gas to the receiving cylinder 110 in a quick manner. The intensifier 200 of the gas distribution system 100 described in FIGS. 1 to 3 is operational while the gas distribution system 100 is not dispensing gas to a receiving cylinder 110, and may be sized smaller to operate more slowly and with lower power consumption in comparison to outlet compressors known in the art. This smaller sizing incurs a lower cost, and a more compact design, than such outlet compressors. This slower operation incurs a lower operation cost than outlet compressors known in the art. The smaller size and slower operation incurs a lower total cost than outlet compressors known in the art, where total cost is the sum of installation and operating costs.

Figure 4:
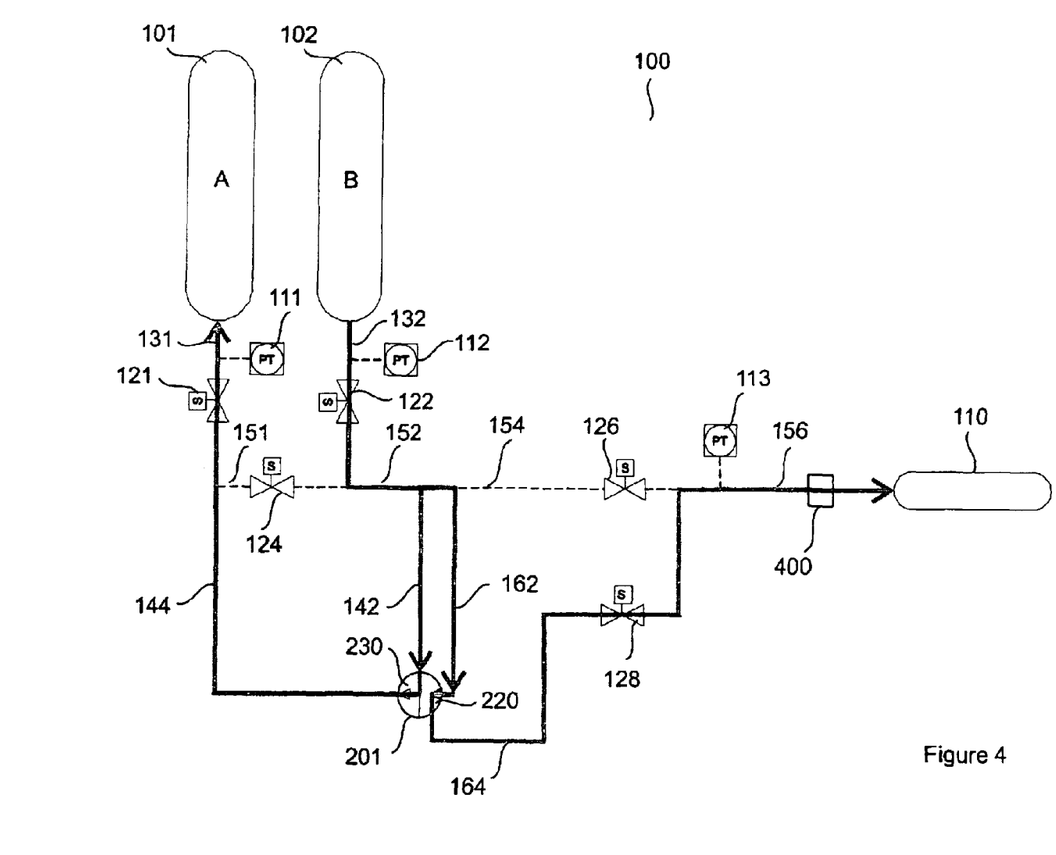
FIGS. 4 to 6 are schematic diagrams of a gas distribution system using an unpowered intensifier, each figure showing one of three stages of a three-stage process.
Figure 5:
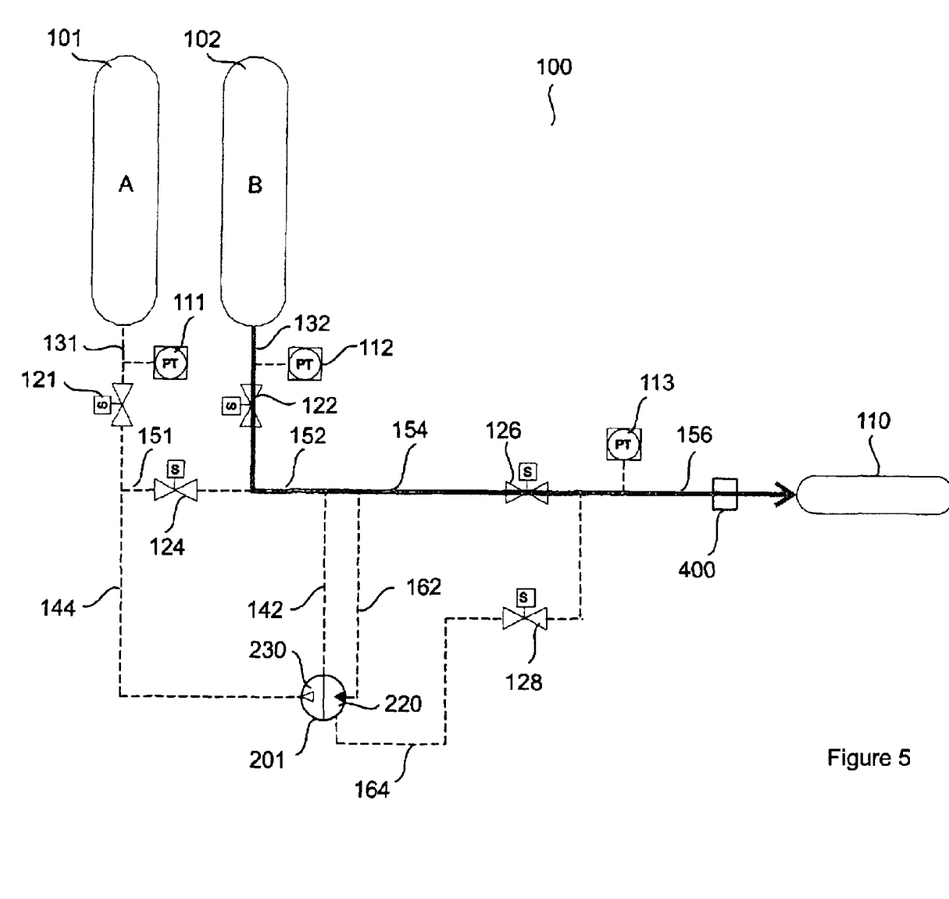
Figure 6:
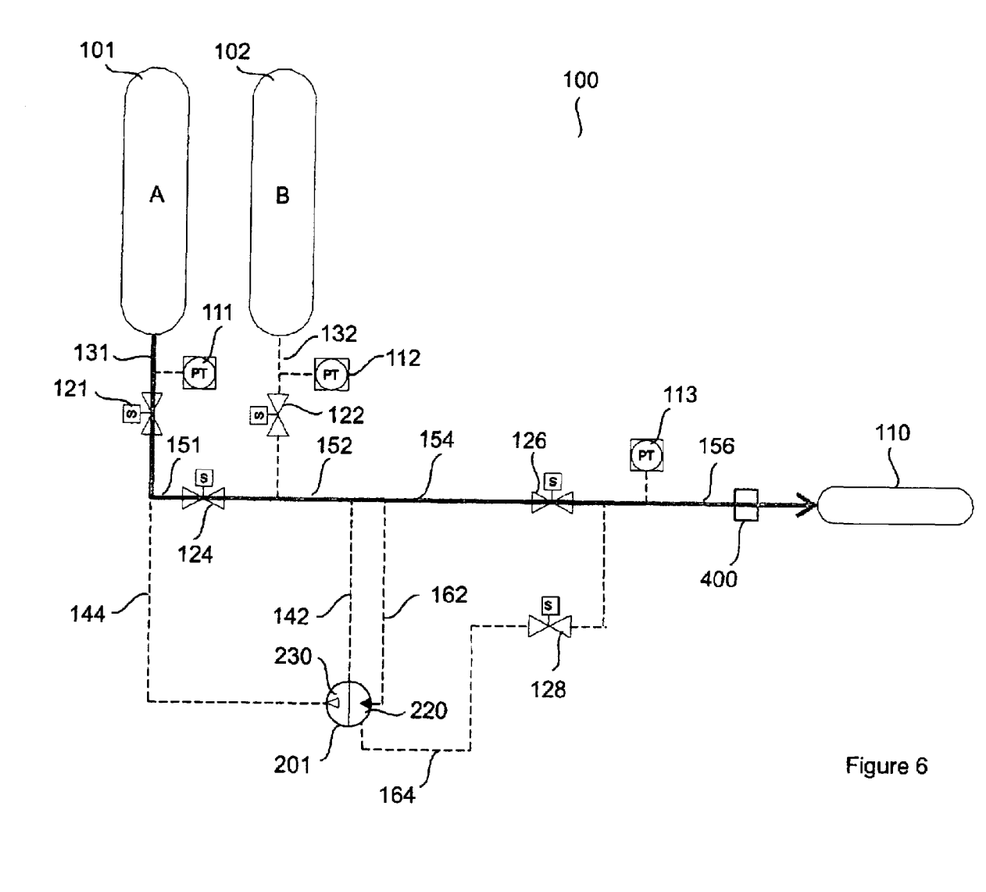

FIGS. 4 to 6 show a gas distribution system 100 that has an unpowered intensifier 201. The intensifier 201 is actuated by the flow of gas from the cylinder B 102 through the intensifier 201 to the service port 400 during gas dispensing. The system and components shown in FIGS. 4 to 6 are the same, while the gas path highlighted in the three drawings is different to indicate the gas flow path used in each of the three described stages of the gas dispensing and internal transfer process using an unpowered intensifier 201.

FIG. 4 shows the gas flow path from cylinder B 102 to a receiving cylinder 110. During gas dispensing from the gas distribution system 100 to a receiving cylinder 110, gas from cylinder B 102 is dispensed first, as indicated by the gas flow path in the figure. The controller (not shown) opens the intensifier drive output line control valve 128 and the cylinder B control valve 122, allowing gas to flow from cylinder B 102 through the cylinder B transfer line 132, the cylinder B output line 152, the intensifier drive supply line 162, the intensifier 201, the intensifier drive output line 164 and the system port line 156 to the service port 400 and into the receiving cylinder 110. This dispensing gas flow goes through the drive side 220 of the unpowered intensifier 201. At the same time, the controller (not shown) opens the cylinder A control valve 121, allowing gas to also flow from cylinder B 102 through the intensifier 201 to cylinder A 101. This internal transfer gas flow goes through the compression side 230 of the intensifier 201. The dispensing gas flow goes through the drive side 220 of the intensifier 201 causing the intensifier to compress the gas flowing through the compression side 230. Consequently, the dispensing flow of gas from cylinder B 102 to the receiving cylinder 110 results in the simultaneous compression of gas into cylinder A 101. The energy of compression is derived from the expansion of gas within the dispensing flow. The expansion of gas within the dispensing flow cools the gas and may also slow the gas flow. The cooling of the gas dispensed to the receiving cylinder 110 is beneficial as gas dispensing systems must be designed to limit temperature and pressure increases within receiving cylinders 110, as is known in the art. When the expansion of gas within the dispensing gas flow slows the gas flow, it increases the fill time to the receiving cylinder 110. The increase in fill time is not significant with respect to the total fill time. Increase in fill time is also beneficial in reducing the pressure and temperature increase within the receiving cylinder 110.

The cylinder B pressure transducer 112 and a receiving cylinder pressure transducer (not shown) signal the system controller (not shown), which uses those signals to calculate the pressure differential between cylinder B and the receiving cylinder 110. The controller compares the pressure differential to a predetermined value, and closes the first transfer line control valve 126 and the cylinder A control valve 121 when the predetermined pressure differential has been reached, or when the cylinder A has reached its maximum pressure or when cylinder B has reached its minimum pressure. Alternatively, a flow sensor (not shown) installed on the circuit is used to measure the gas flow and signal the controller. When a flow sensor is installed, the controller compares the gas flow to a predetermined value, and closes the first transfer line control valve 126 and cylinder A control valve 121 when the predetermined flow has been reached, or when the flow is zero.

FIG. 5 shows the next stage in gas dispensing following that shown in FIG. 4, and indicates the gas flow path of this stage. The detailed process is identical to FIG. 1 using the flow circuit described herein.

FIG. 6 shows the next stage in gas dispensing following that shown in FIG. 5, and indicates the gas flow path of this stage. The detailed process is identical to FIG. 2 using the flow circuit described herein.

In the preferred embodiment, the intensifier 200, 201 is a piston-type intensifier, and designed for compression of hydrogen gas. A piston-type intensifier cannot "free-wheel" that is, it operates whenever a drive stream of gas is applied, and has no "neutral" mode. While a powered intensifier 200 and an unpowered intensifier 201 are described herein, a piston-type intensifier can operate in both powered and unpowered modes through the application of appropriate routing and valving as is known in the art. Alternatively a dual-fluid intensifier may be used to incorporate the functionality of an intensifier 200 and an unpowered intensifier 201 into one intensifier. The intensifier 200, 201 may have multiple stages to increase the output pressure.

The dispensing and internal transfer steps described for FIGS. 1 to 3, and the dispensing steps described for FIGS. 4 to 6 can be combined into one dispensing and internal transfer procedure that follows the steps described in succession for FIGS. 4, 1, 2 and 3. Such a four-step procedure gains the advantages on both the unpowered intensifier 201 and the powered intensifier 200 as described for those figures.

The gas distribution system 100 may have additional cylinders beyond the two gas storage cylinders 101, 102 described above. While the described figures detail systems of two gas storage cylinders, it should be understood that each described cylinder can be multiplied in number to increase the total amount of gas available for dispensing, and to increase the number of dispensing stages. An increased number of dispensing stages does not alter the sequential dispensing of gas from cylinders containing progressively higher pressures of gas. Multiplying of the number of cylinders does not require additional intensifiers 200, 201, but requires additional gas routing and valving as would be appreciated by one skilled in the art.

In one embodiment, the additional cylinders act as additional high pressure cylinders 101 and additional lower pressure cylinders 102. The additional cylinder As 101 may act in tandem with the first cylinder A, thereby increasing the volume of gas transferred in all gas transfers involving cylinder As. Likewise, additional cylinder Bs 102 may act in tandem with the first cylinder B, thereby increasing the volume of gas transferred in all gas transfers involving cylinder Bs.

In another embodiment, the additional lower pressure cylinders 102 are used sequentially to dispense gas, in the manner shown in FIGS. 1 and 5. In this embodiment, the cylinder with the lowest pressure is used to dispense gas first, followed by the second lowest, the third lowest etc., as long as the storage cylinder contains higher pressure gas than in the receiving cylinder 110. Likewise, the additional high pressure cylinders 101 are used sequentially to dispense gas, in the manner shown in FIGS. 2 and 6.

Figure 7:
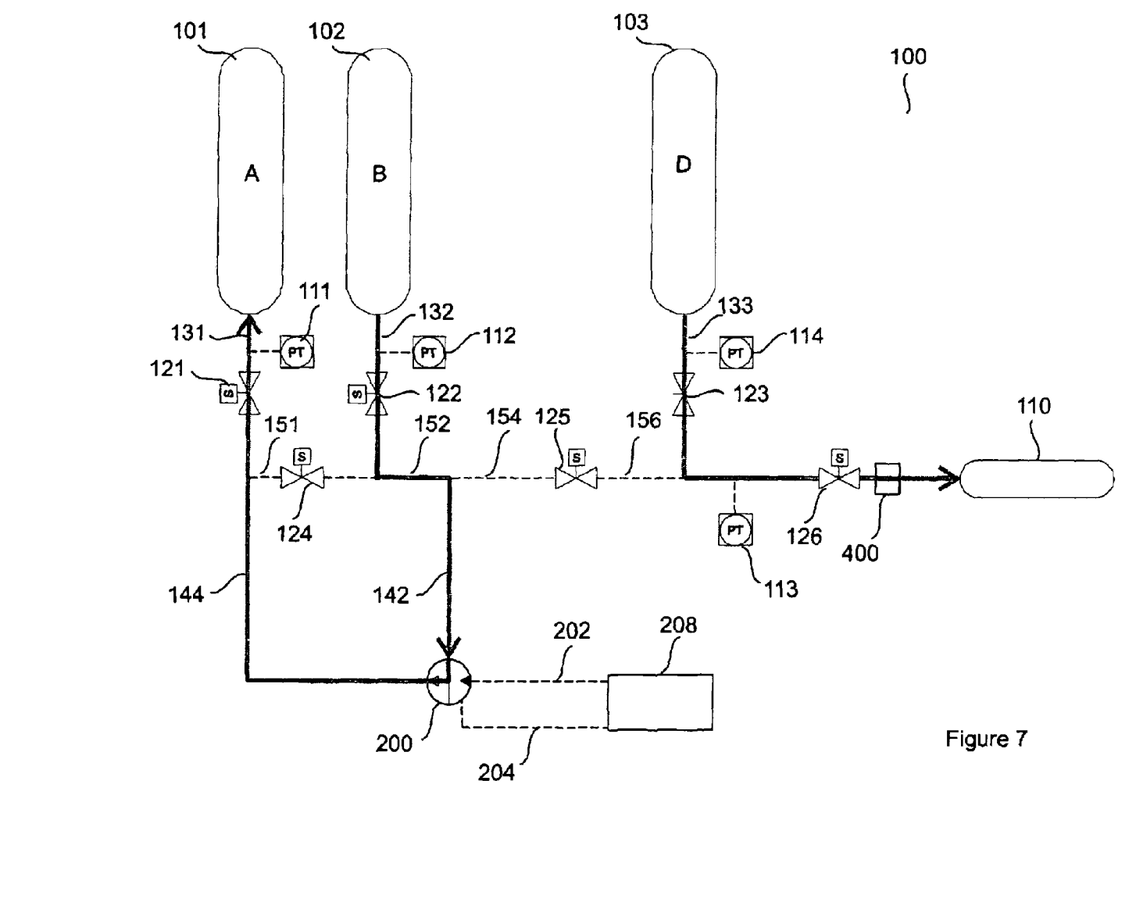
FIG. 7 is a schematic diagram of a gas distribution system that has three cylinders and a powered intensifier.

FIG. 7 illustrates a gas distribution system 100 that has three cylinders, namely a cylinder A 101, a cylinder B 102 and an additional lower pressure cylinder 103, which for brevity is called cylinder D 103. Cylinder D has a control valve 123, and a pressure transducer 114. The system also has an internal transfer shutoff valve 125 that, when closed, isolates cylinders A and B from cylinder D. In this embodiment, the dispensing flow described for the cylinder B 102 in FIG. 1 can take place from cylinder D 103 of FIG. 7, at the same time as the internal transfer described for FIG. 3. The flow of gas from cylinder D 103 is actuated by opening the additional pressure cylinder control valve 123. The dispensing gas flow from cylinder D 103 to the receiving cylinder 110 is terminated by the same process as described for FIG. 1. In order for both gas flows to occur simultaneously, the internal transfer shutoff valve 125 is closed. The transfer gas flow from cylinder B 102 to cylinder A 101 is terminated by the same process as described for FIG. 4.

Figure 8:
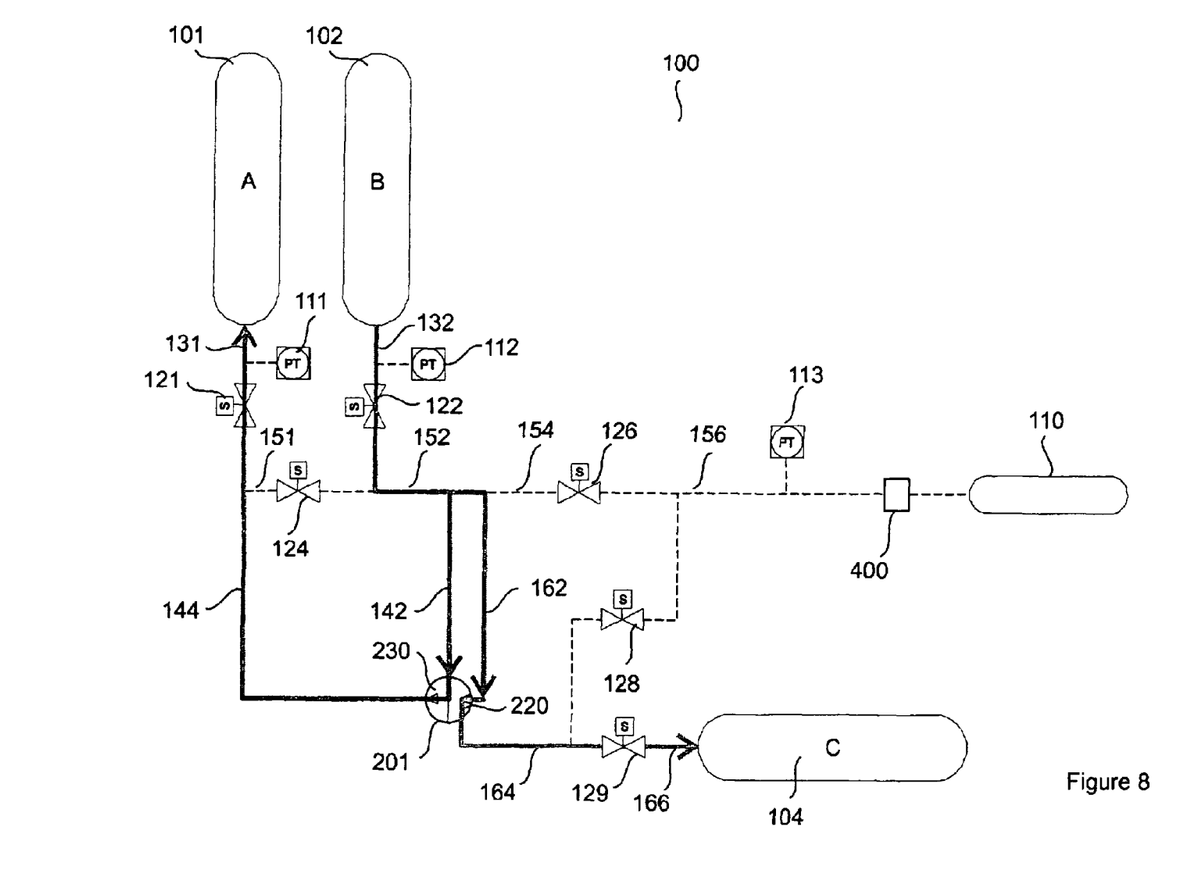
FIG. 8 is a schematic diagram of a gas distribution system that has three cylinders and an unpowered intensifier.

FIG. 8 illustrates a gas distribution system 100 with three cylinders in which the internal transfer flow is actuated by an unpowered intensifier 201 driven by the gas flow from cylinder B 102 to a second lower pressure cylinder 104, which for brevity is called cylinder C 104. Cylinder C has a control valve 129, and optionally has a pressure transducer (not shown).

Whereas the gas flow that activates the unpowered intensifier 201 described for FIG. 4 is a dispensing gas flow, the gas flow that activates the unpowered intensifier 201 illustrated in FIG. 8 is an internal gas transfer within the gas distribution system 100. The controller (not shown) opens the intensifier drive output transfer line control valve 128, the cylinder B control valve 122 and the cylinder C control valve 129, allowing gas to flow from cylinder B 102 through the cylinder B transfer line 132, the cylinder B output line 152, the intensifier drive supply line 162, the intensifier 201, the intensifier drive output line 164 and the cylinder C transfer line 166 to cylinder C 104. This gas transfer flow goes through the drive side 220 of the unpowered intensifier 201. At the same time, the controller (not shown) opens the cylinder A control valve 121, allowing gas to also flow from cylinder B 102 through the intensifier 201 to cylinder A 101. This internal transfer gas flow goes through the compression side 230 of the intensifier 201. The activating gas flow through the drive side 220 of the intensifier 201 causes the intensifier to compress the gas flowing through the intensifier's compression side 230. Consequently, the transfer flow of gas from cylinder B 102 to cylinder C 104 results in the simultaneous compression of gas into cylinder A 101. The energy of compression is derived from the cylinder C gas transfer flow in the manner described for FIG. 4.

Figure 9:
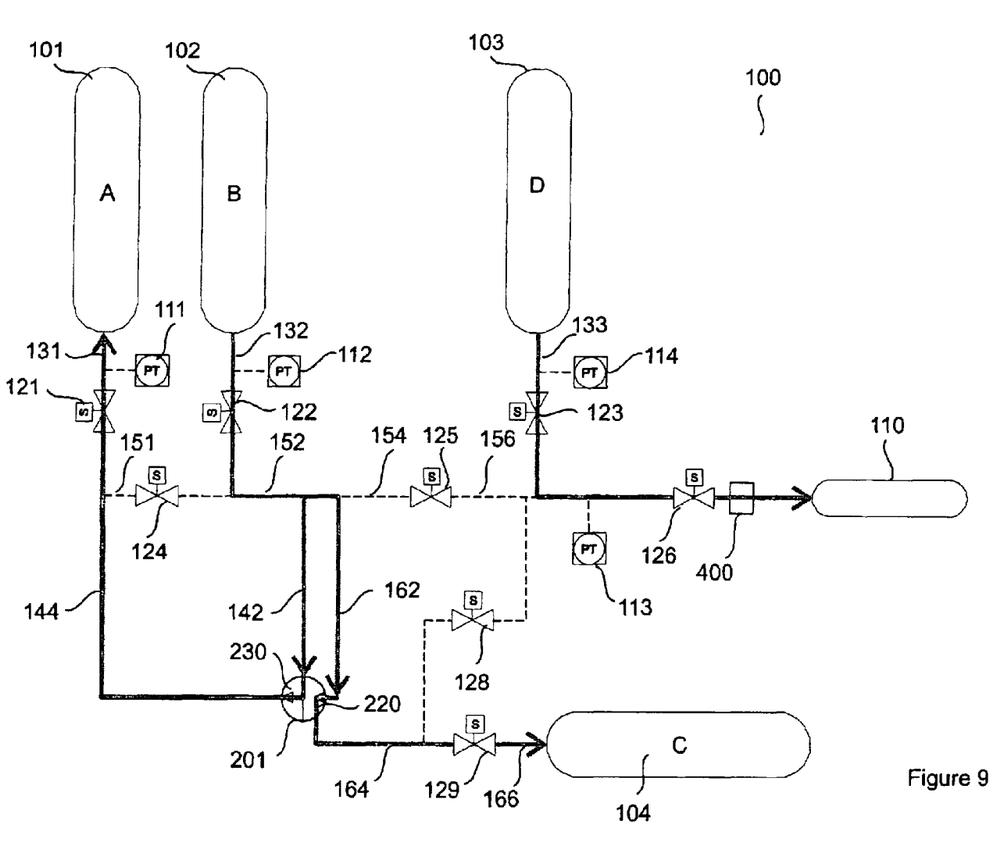
FIG. 9 is a schematic diagram of a gas distribution system that has four cylinders and an unpowered intensifier.

FIG. 9 shows a gas distribution system 100 with four cylinders in which the internal transfer flow is the same as described for FIG. 8, and is actuated by an unpowered intensifier 201 driven by the gas flow from cylinder B 102 to cylinder C 104. FIG. 9 also has an additional lower pressure cylinder 103 that can dispense gas to a receiving cylinder 110 at the same time and independently of the internal gas transfer.

The above embodiments may further include a system controller (not shown) that is communicative with the intensifier 200, the control valves 121, 122, 123, 124, 125, 126, 128, 129, and the service port 400. The communication may be wireless or wired. In the described alternative embodiments that provide a flow sensor (not shown), the system controller is communicative with the flow sensor.

The system controller is programmed with a pressure optimizing algorithm that is executed to periodically transfer hydrogen between at least one cylinder B 102 and one cylinder A 101 for the purpose of optimizing the hydrogen available at high pressure, such that the hydrogen in at least one of the storage cylinders is at a pressure that is suitable for dispensing hydrogen to the receiving cylinder 110 at a fast rate, i.e. to provide a "fast fill" to the receiving cylinder.

To carry out this method, the system controller monitors the pressure within each cylinder 101, 102 via the pressure transducers 111, 112 and based on the sensor readings, activates the intensifier 200 to compress and transfer hydrogen from a cylinder B 102 to a cylinder A 101. Similarly, the system controller monitors the pressure within each cylinder 101, 102 via the pressure transducers 111, 112, 113, and based on the sensor readings de-activates the intensifier 200 to stop compressing and transferring hydrogen. Alternatively, the system controller monitors the mass flow from the cylinder during gas transfer via flow sensors (not shown), and based on the flow sensor readings, activates and de-activate the intensifier 200.

By controlling the control valves 121, 122, 123, 124, 125, 126, 128, 129, the system controller controls the dispensing of hydrogen from the cylinders 101, 102, 103 to the service port 400. By controlling the control valves, the system controller also controls which cylinder(s) are dispensing hydrogen, and which cylinder(s) are receiving hydrogen. By controlling the control valves, the system controller also controls the flow of hydrogen through the powered intensifier 200 and the unpowered intensifier 201.

In an alternative embodiment, flow control valves (not shown) may be located at the service port 400 that are communicative with the system controller. In the case of the service port, the system controller may be configured to open the service port control valve (not shown) when a vehicle (not shown) has successfully coupled with the service port and is ready to receive hydrogen.

Similarly, the system controller may be configured to open the service port control valve (not shown) and other necessary control valves when a tanker truck (not shown) has successfully coupled with the service port and is ready to supply hydrogen.

A suitable intensifier 200 is manufactured by Hydro-Pac Inc., whose Model C06-06-300 LX-V hydraulic compressor is operational for inlet pressures ranging from 300 to 6000 psig and has a maximum discharge pressure of 6000 psig and can compress up to 11 Liters of hydrogen per minute, however, other suitable hydraulic, pneumatic or electric compressors with similar operating parameters may be used.

The storage cylinder 101, 102, 103, 104, may be a Dynetek W205H350G8N cylinder; however other suitable high pressure gas storage cylinders may be used.

The pressure transducer 111, 112, 113 may be a Noshok 100.10000.2137 pressure transducer; however other suitable high pressure gas pressure transducer may be used.

The control valve 121, 122, 123, 124, 125, 126, 128, 129 may be a Parker 6AHB4LPKR EPR SS 61 AC-2 valve; however other suitable high pressure control valves may be used.

In another embodiment, a continuous gas supply (not shown) is coupled to the system 100, and the continuous gas supply acts as another gas storage cylinder 101, 102, 103.

The gas distribution system 100 described herein is also effective for a fueling system that includes a hydrogen generator (not shown), such as an electrolyzer or a natural gas reformer, which typically outputs hydrogen at low pressures. The hydrogen generated by the hydrogen generator is typically transferred to a gas storage cylinder, which through the nature of gas transfer, can only be filled to a pressure equal to the output pressure of the hydrogen generator. While conventional hydrogen generating systems compress the generated hydrogen between the generator outlet and the receiving cylinder inlet in order to increase the amount of gas stored within the receiving cylinder, the gas distribution system 100 obviates the need for an outlet compressor through the use of internal gas transfers as described for FIGS. 3, 4, 8 and 9.

The gas distribution system 100 described herein may be housed on a mobile base, such as a truck bed or a trailer, for the purpose of dispensing gas to receiving cylinders 110 that cannot be moved to the system.

The gas distribution system 100 described herein is also effective for a defueling system that removes gas from a gas storage cylinder, such as a vehicle gas storage cylinder. Defueling is the process of transferring gas from a cylinder that contains gas, such as the receiving cylinders 110 described herein, to a dispensing or storage cylinder. The gas distribution system 100 is not limited to dispensing gas, and is capable of receiving gas. To receive gas, the storage cylinder must be at a pressure lower than the cylinder to be defueled. The gas distribution system 100 can internally transfer its existing gas charge so that one cylinder B 102 contains very little gas, thereby creating the necessary pressure differential between the storage cylinder 102 and the cylinder to be defueled. The internal transfer capability of the system 100 can be used continually to transfer gas from the cylinder B 102 that has received the defueled gas, to another gas storage cylinder of the system in order to reduce the pressure within cylinder B and thereby maintain the pressure differential necessary for the defueling process. Furthermore, the defueling gas flow can be routed through the powered intensifier 200 in order to transfer it to a gas storage cylinder that contains gas at an equal or higher pressure than within the cylinder to be defueled. Additionally to receive defueled gas, the service port 400 must be configurable to transfer gas from the cylinder to be defueled to the storage cylinder, and the valving, piping and other coupling components and fittings must be designed for bi-directional gas transfer. The described gas distribution system 100 is designed for such bi-directional functionality.

While the preferred embodiment of the invention has been illustrated and described, it will be appreciated that various changes can be made therein without departing from the scope and spirit of the invention.

What is claimed is:

1. A method of filling a receiving cylinder with gas comprising:
    (a) flowing a first gas stream from a first dispensing cylinder to a receiving cylinder using a pressure differential between the cylinders;
    (b) when the pressure differential between the first dispensing cylinder and the receiving cylinder has fallen to a selected value, stopping the flow of the first gas stream, then flowing a second gas stream from a second dispensing cylinder to the receiving cylinder using a pressure differential between the second dispensing cylinder and the receiving cylinder; and
    (c) when the pressure differential between the second dispensing cylinder and the receiving cylinder has fallen to a selected value, stopping the flow of the second gas stream, then increasing the pressure of a third gas stream from the first dispensing cylinder to a pressure greater than the pressure in the second dispensing cylinder, and then flowing the third gas stream into the second dispensing cylinder until the pressure in the second cylinder has increased to a selected value.

2. The method of claim 1 wherein the third gas stream pressure is increased by an intensifier.

3. The method of claim 2 wherein the intensifier is powered by one of a hydraulic pump, an air compressor and an electric motor.

4. The method of claim 2 further comprising before step (a), flowing a fourth gas stream from the first dispensing cylinder, through a driver of the intensifier then to the receiving cylinder using a pressure differential between the first dispensing cylinder and the receiving cylinder, and then flowing the third gas stream from the first dispensing cylinder through a compressor of the intensifier to increase the third gas stream pressure.

5. The method of claim 1 wherein in step (b), the first gas stream flow is stopped when the pressures of the first dispensing cylinder and receiving cylinder have equalized.

6. The method of claim 1 wherein in step (c), the second gas stream flow is stopped when the pressures of the second dispensing cylinder and receiving cylinder have equalized.

7. A method of filling a receiving cylinder with gas using an intensifier having a compressor driven by a gas stream, the method comprising:
    (a) flowing a first gas stream from a first dispensing cylinder, through the driver side of an intensifier and then to a receiving cylinder using a pressure differential between the cylinders;
    (b) flowing a second gas stream from the first dispensing cylinder through a compressor of the intensifier such that the pressure of the second gas stream is increased above the pressure of a second dispensing cylinder, then flowing the second gas stream to the second dispensing cylinder;
    (c) when the pressure differential between the receiving cylinder and the first dispensing cylinder has fallen to a first selected value, stopping the flow of the first and second gas streams, then flowing a third gas stream from the first dispensing cylinder to the receiving cylinder that bypasses the intensifier and uses a pressure differential between the first dispensing cylinder and the receiving cylinder; and
    (d) when the pressure differential between the receiving cylinder and the first dispensing cylinder has fallen to a second selected value, stopping the flow of the third gas stream, then flowing a fourth gas stream from the second dispensing cylinder to the receiving cylinder using a pressure differential between the second dispensing cylinder and the receiving cylinder.

8. A gas dispensing system for filling a receiving cylinder with gas, the system comprising:
    (a) a receiving cylinder port fluidly connectable to a receiving cylinder;
    (b) a first dispensing cylinder;
    (c) a second dispensing cylinder;
    (d) a gas pressure intensifier;
    (e) a fluid flow circuit comprising fluid conduits fluidly coupling the first dispensing cylinder to the receiving cylinder port, the second dispensing cylinder to the receiving cylinder port, and the first dispensing cylinder to the second dispensing cylinder, and wherein the intensifier is fluidly coupled to the fluid flow circuit such that the pressure of a gas stream from the first cylinder can be increased above the pressure of the second cylinder thereby enabling the gas stream to be flowed from the first cylinder into the second cylinder; and
    (f) gas flow valves fluidly coupled to the fluid flow circuit such that a gas stream can be controlled to flow from the first dispensing cylinder to the receiving cylinder port, from the second dispensing cylinder to the receiving cylinder port, and from the first dispensing cylinder through the intensifier and to the second dispensing cylinder.

9. The system of claim 8 wherein the intensifier is powered by one of a hydraulic pump, an air compressor and an electric motor.

10. The system of claim 8 wherein the intensifier comprises a compressor and a fluid driver that powers the compressor, and the fluid flow circuit further comprises a first fluid flow path from the first dispensing cylinder through the driver and to the receiving cylinder port, and a second fluid flow path from the first dispensing cylinder through the compressor and to the second dispensing cylinder, and the gas flow valves being configured to direct first and second gas streams through the first and second fluid flow paths such that the first gas stream powers the intensifier to increase the pressure of the second gas stream flowing therethrough.

11. The system of claim 8 further comprising; a system controller in communication with said gas flow valves for actuating said gas flow valves in response to one of an external fill request signal and measurement of said cylinders and receiving cylinder conditions.

* * * * *